United States Patent [19]

Bednar et al.

[11] Patent Number: 4,573,200
[45] Date of Patent: Feb. 25, 1986

[54] VIDEO NORMALIZATION FOR HAND PRINT RECOGNITION

[75] Inventors: Gregory M. Bednar, Matthews; Brian E. Fitzpatrick, Charlotte; John C. Harmon, Concord; Manthri S. I. Narasimha, Charlotte, all of N.C.

[73] Assignee: International Business Machines Corporation, Armonk, N.Y.

[21] Appl. No.: 453,018

[22] Filed: Dec. 27, 1982

[51] Int. Cl.[4] .............................................. G06K 9/42
[52] U.S. Cl. ...................................... 382/47; 364/582
[58] Field of Search ........................... 382/47; 364/582

[56] References Cited

U.S. PATENT DOCUMENTS

| | | | |
|---|---|---|---|
| 3,289,164 | 11/1966 | Rabinow | 382/47 |
| 3,710,323 | 1/1973 | Andrews et al. | 382/47 |
| 3,784,981 | 1/1974 | Borowski, Jr. et al. | 382/47 |
| 3,976,982 | 8/1976 | Eiselen | 382/47 |
| 4,034,344 | 7/1977 | Saraga et al. | 382/47 |
| 4,097,846 | 6/1978 | Lewis | 382/47 |

*Primary Examiner*—Leo H. Boudreau
*Assistant Examiner*—Joseph Mancuso
*Attorney, Agent, or Firm*—Kenneth A. Seaman

[57] ABSTRACT

In the machine recognition of hand printed characters it is desirable that the characters be constrained to a uniform size. This may be accomplished by taking a relatively unconstrained hand printed character and, through simple logical processes involving eliminating and/or combining portions of the unconstrained character, obtain a constrained character of a specified size. To obtain this specified character, the unconstrained characters are stored in a video line buffer as a plurality of rows of binary bits. When a row character is located in the video line buffer a process of vertical and horizontal consolidation is initiated. In the vertical consolidation, which is performed first, predetermined rows of the bits of the row character are selectively combined with other rows of stored bits or selected without change to reduce the height of the character to a predetermined desired height. Unselected rows are ignored. As the rows of bits are obtained during vertical consolidation, horizontal consolidation of each row is initiated. This consolidation is performed on a byte by byte basis so that each row is transformed in accordance with a predetermined relationship between the width of the row character and the desired width.

2 Claims, 17 Drawing Figures

FIG. 5B

8/2 BIT TABLE 01

8/2 BIT TABLE 02

8/2 BIT TABLE 03

8/2 BIT TABLE 04

8/4 BIT TABLE 05

8/4 BIT TABLE 06

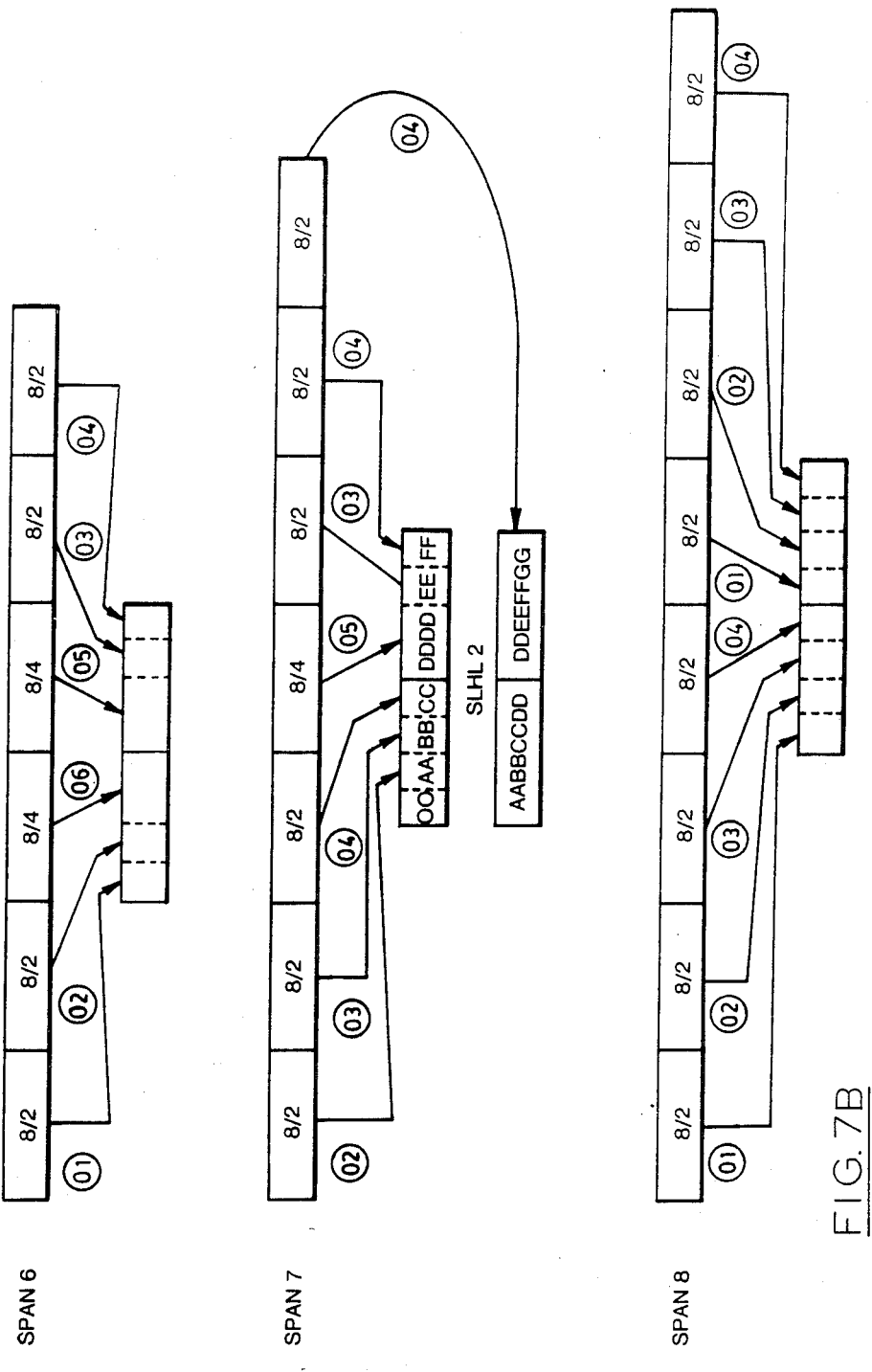

VIDEO NORMALIZATION FOR HAND PRINT RECOGNITION

For many years a fast and efficient method of automatically recognizing hand printed characters so that they may be used as input for data processing or like systems has been sought. In the past these systems have tended to be large and complex because of the need to recognize the large variations in shapes and styles produced by different writers. To overcome this problem, many attempts have been made to convert the variable input information to a form which can be more readily recognized. The present inventors have discovered an improved method and apparatus for obtaining a normalized form of the hand printed characters so that recognition is possible with a system which can be quite small and simple and is inexpensive enough to be suitable for use in a relatively remote location where there are low volumes of input data so that a large equipment expenditure cannot be justified.

The present invention is particularly concerned with the recognition of hand printed characters. It is well known that hand printed characters can be recognized, provided sufficient detailed information on the form of the character is retained so that the character can be compared with a standardized set of known characters. However, these systems tend to be very slow in operation and expensive in terms of storage and processing requirements. To overcome this difficulty, the prior art has evolved means for normalizing the shape of the hand printed characters so that they tend to more directly correspond to the form of the character as portrayed in a standardized set of characters. Even in these cases the requirements for normalizing the character itself were expensive and difficult to achieve. The present inventors have discovered a much more efficient and inexpensive means of normalizing hand printed characters.

U.S. Pat. No. 3,710,323 to Andrews et al and which is partially assigned to the present assignee, discloses a technique for normalizing printed characters by selecting particular rows and columns of a pattern representative of the unnormalized character to be retained in a pattern representative of a normalized form of the character. In the Andrews et al patent this is accomplished by selecting particular bits from a matrix representation of the unnormalized character and transforming these bits into a normalized matrix representation of the character.

The present inventors have discovered that, by selectively deleting or logically combining rows of a matrix of bits representing a hand printed character and grouping and logically combining the bits in each resulting row in a manner determined by the overall width of the character, a normalized character of an optimum size can be obtained. The character so obtained is at least as recognizable as the normalized characters provided by prior techniques such as are disclosed in the Andrews et al patent mentioned hereinbefore and requires less complicated recognition equipment.

In broad, general terms, the normalizing function is conceptualized in taking specified portions of an image representation of a manually printed character, either alone or in combination with other portions of the representation, and forming from the specified portions a second image representation of the character which more closely represents the character in an optimum size to improve the recognition process in a character recognition system. Purely for exemplary purposes, a hand printed number such as "6" may result in an image representation which is forty rows high and thirty-three columns wide. By using the inventors normalization process, this character image may be reduced to an image which is sixteen rows high and thirteen columns wide and is reliably distinguishable by a character recognition system.

This normalizing function is accomplished by taking a relatively unconstrained hand printed character and, through simple logical processes involving eliminating and/or combining portions of the unconstrained character, obtaining a constrained or normalized character of a specified size. In the process of obtaining this specified character, the characters to be transformed are stored in a video line buffer as a plurality of rows of binary bits. Each row represents a single scan line across a line of characters as obtained by a scanner device. Once a raw character has been located in the video line buffer a process of vertical and horizontal consolidation is undertaken. The vertical consolidation of each row of the character is undertaken first. In this consolidation, predetermined rows of the bits of the unnormalized character are selectively combined with other rows of the stored bits, or selected without change to reduce the height of the character to a predetermined desired height. Unselected rows are ignored. As the rows of bits of the character are obtained during this vertical consolidation, horizontal consolidation of each selected row of bits is initiated. Horizontal consolidation of each row is undertaken on a byte by byte basis so that bytes in each row are transformed in accordance with a predetermined relationship between the width of the unnormalized character and the desired normalized width.

Character image normalization to an extremely compact matrix is accomplished through the use of a general purpose micro-processor. The invention is particularly adaptable to the organization of the micro-processor since the format by which the information is handled takes advantage of the capabilities of the micro-processor by adopting byte-oriented functions that can be readily implemented by table look-up techniques. Image consolidation in one dimension, usually the horizontal dimension, provides image reduction by successively transforming 8-bit bytes by reference to tables which identify the amount of reduction required and determine the form of the reduction. Consolidation in the transverse dimension, usually the vertical dimension, is accomplished by selectively combining rows by OR'ing rows together or selecting entire lines representative of the image. Control of this process is accomplished by retrieving from memory a set of control words corresponding to lines in the normalized image. The control words specify lines of the original image to be included or consolidated into the normalized image.

It is accordingly a primary object of the present invention to optimize the normalization of a hand printed character so as to improve the character recognition systems ability to recognize hand printed characters.

This object is accomplished by first forming a two-dimensional input image of a unitary figure as a matrix of picture elements in rows and columns. A plurality of consolidation rules, each of which specifies a predetermined transformation of an input byte of the image data into an output byte of transformed image data is stored in the computer system. The rules are each associated with different degrees of size reduction. The size of the input image is determined and the rules are selected in accordance with that determination and bytes of the input image are transformed into image data of a normalized size by reference to the selected rules.

More specifically, the invention provides a method for normalizing a variable size two-dimensional input image which is retained as a series of rows and columns in a storage buffer. The rows of the image in the storage buffer are transformed in accordance with a table of vertical transformation rules which specify, in accordance with the height of the image, which lines of the unnormalized image are to be selected or consolidated with other rows of the ultimately consolidated image. The so selected and consolidated rows are then subjected to horizontal transformation by means of horizontal transformation rules which byte transform each row in accordance with a° horizontal transformation table to thereby provide a normalized image of a specified height and width.

The invention may be better understood by reference to the following drawings in which.

Figure 3A:
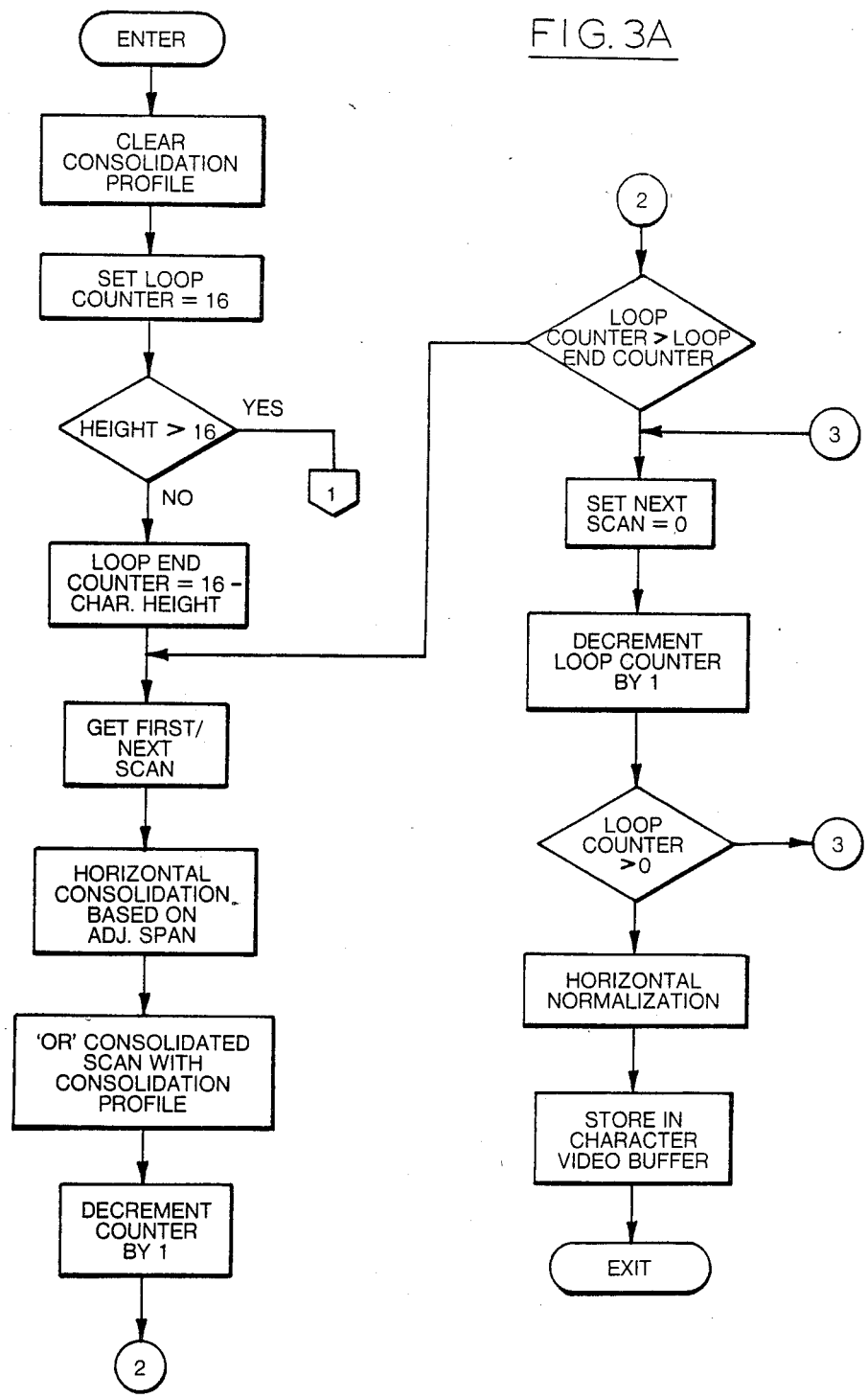
Figure 3B:
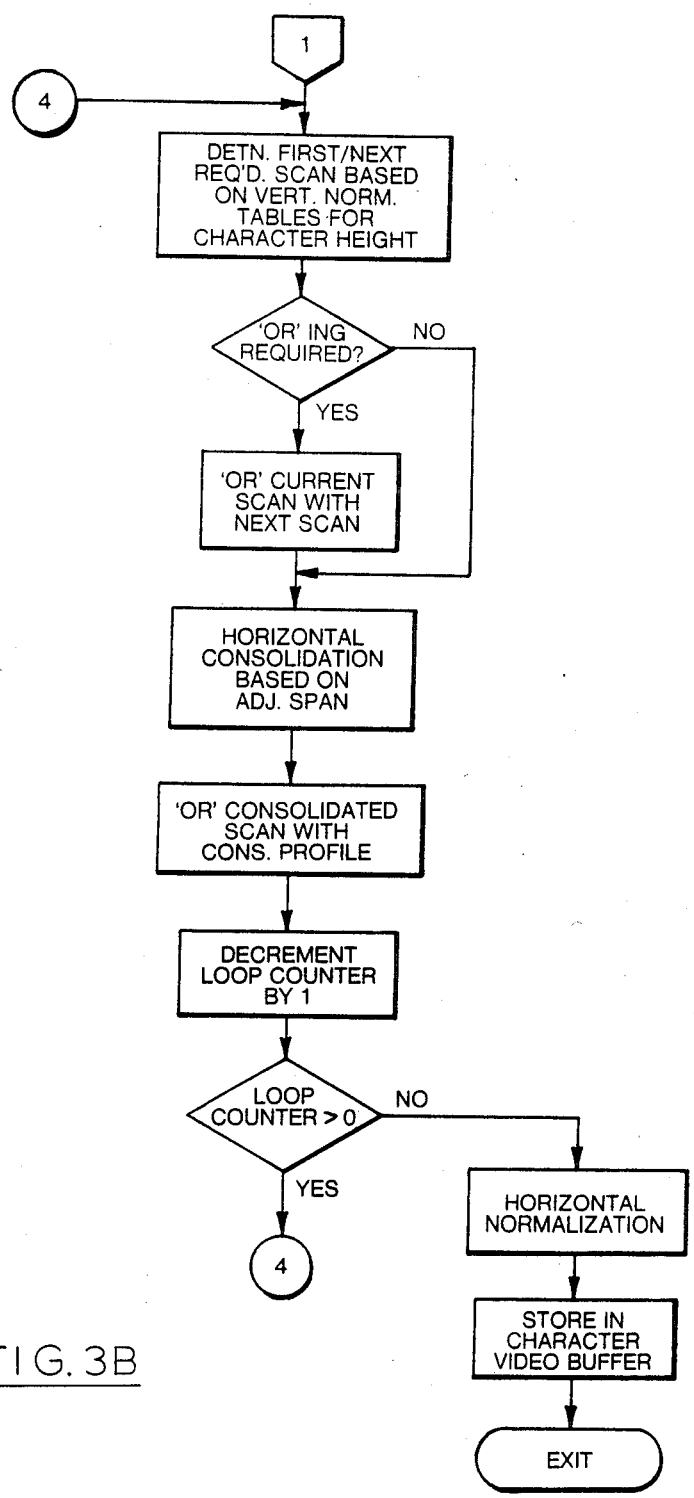
Figure 4:
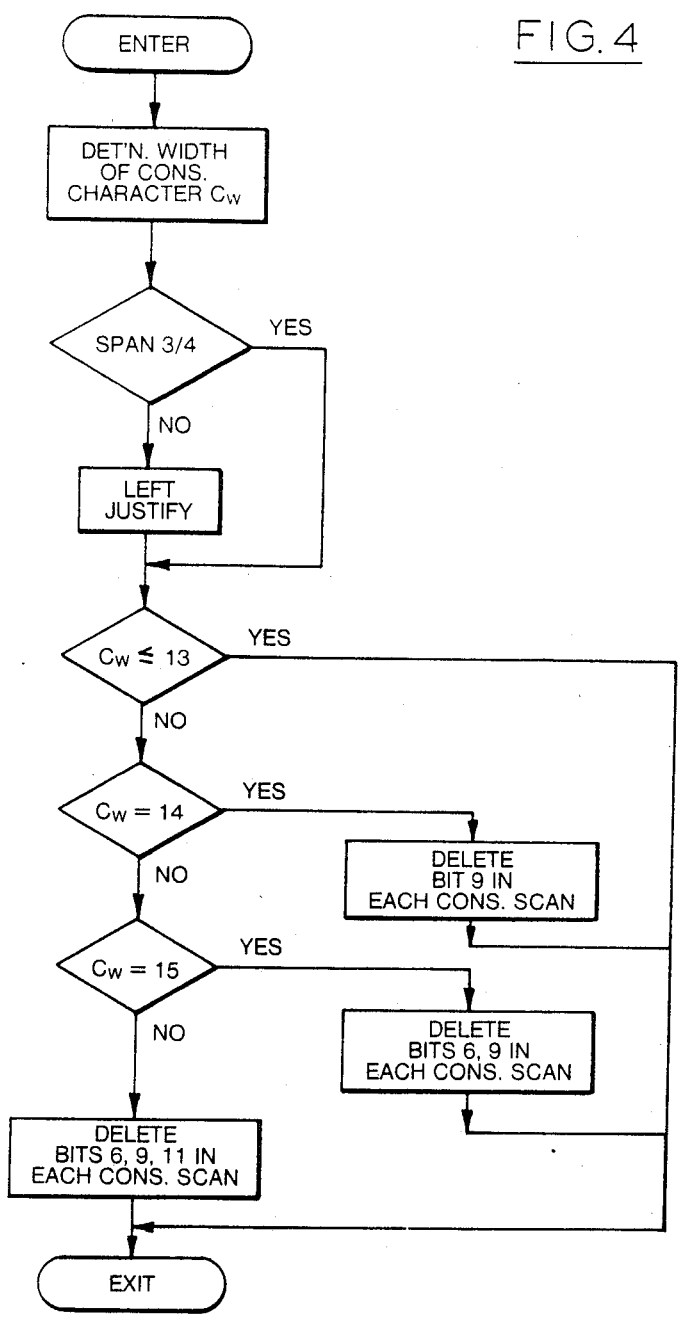
Figure 5A:
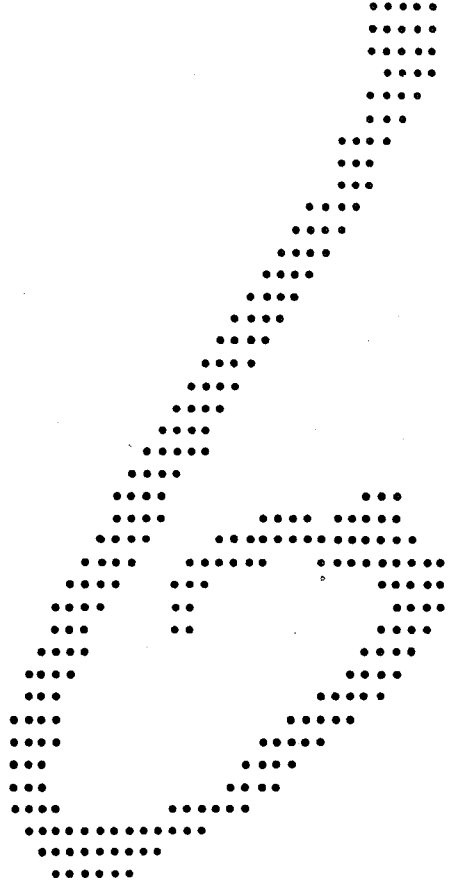
Figure 5B:
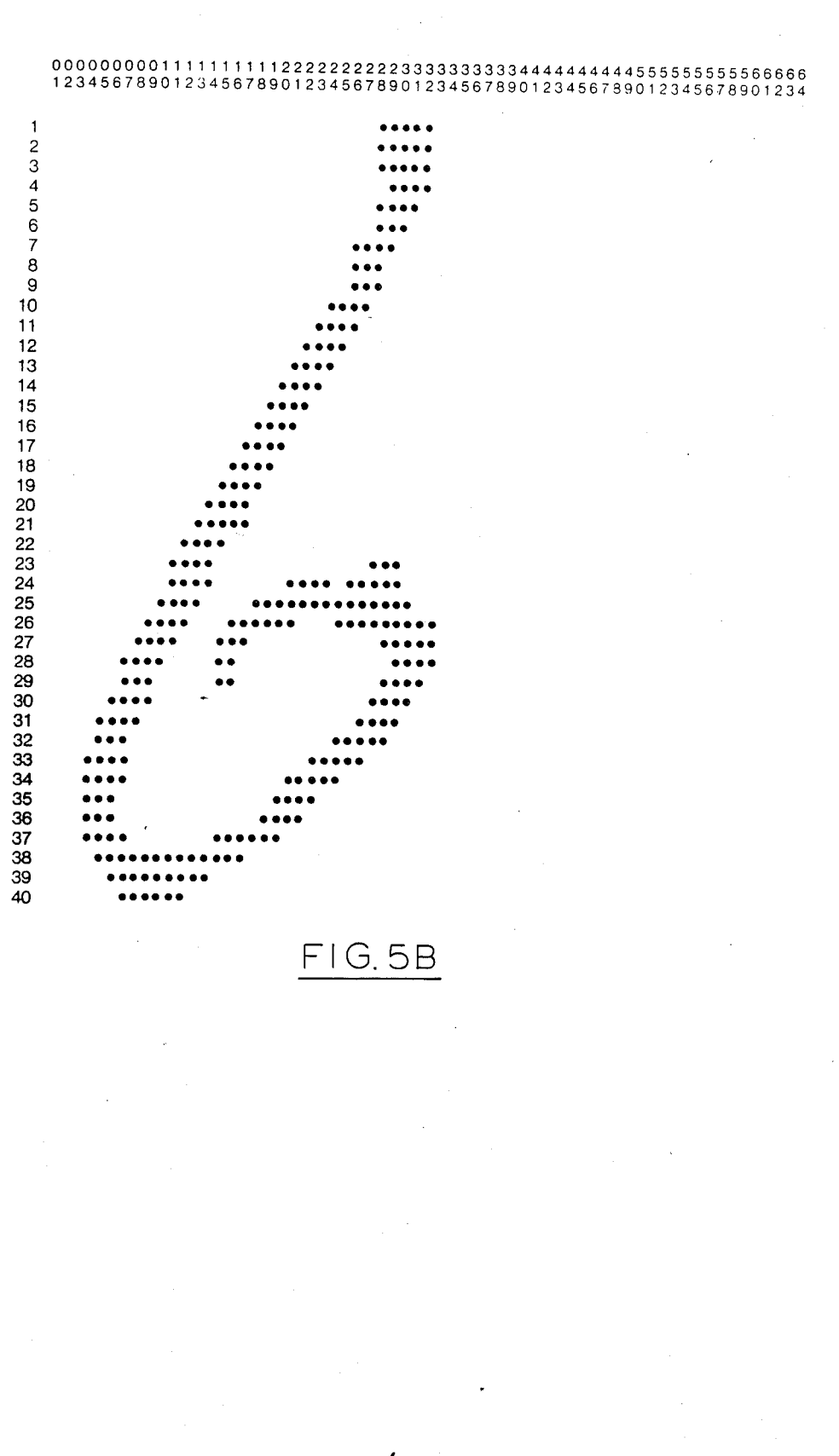
Figure 5C:
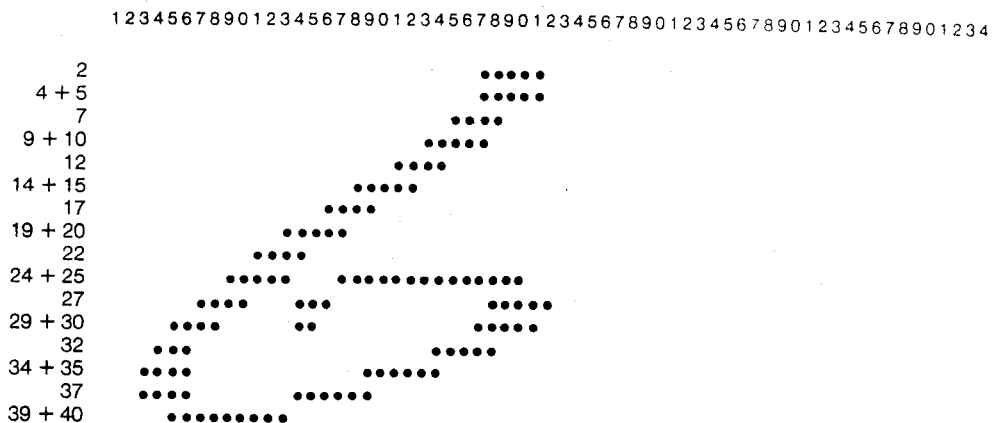
Figure 5D:
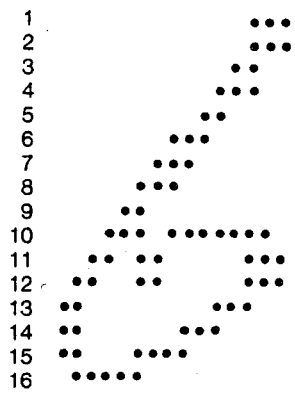
Figure 5E:
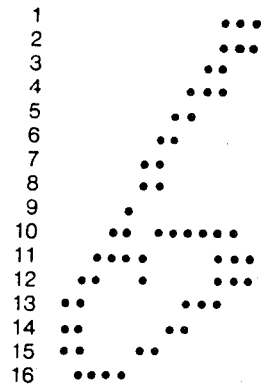
Figure 6:
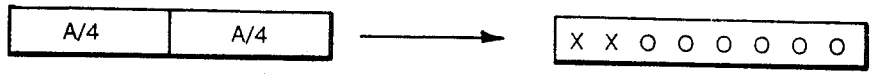
Figure 6:
Figure 6:
Figure 6:
Figure 6:
Figure 6:
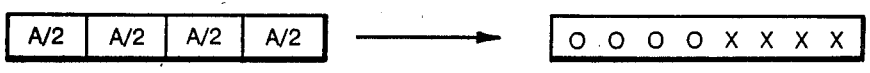

FIGS. 3A and 3B show, in a flow diagram, the normalization procedure used on a detected character, FIG. 4 shows, in a flow diagram, the horizontal normalization process, FIGS. 5A to 5E show the effect of the normalizing sequence on a hand printed form of the character "6", FIG. 6 shows, schematically, the consolidation tables used to horizontally consolidate byte portions of the unconsolidated character.

Figure 7A:
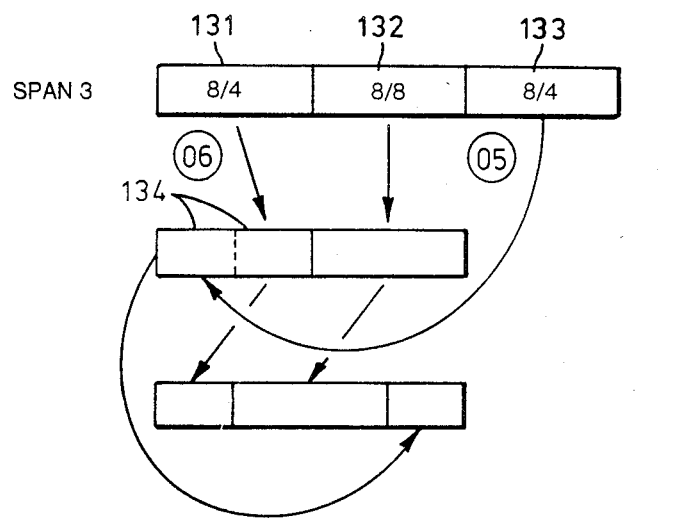

FIGS. 7A and 7B show, schematically, the actual process of replacing portions of the unconsolidated horizontal row of a character with the consolidated bits for that row.

FIGS. 8A to 8D show, in flow diagrams, the horizontal consolidation of characters of different span widths.

Figure 1:
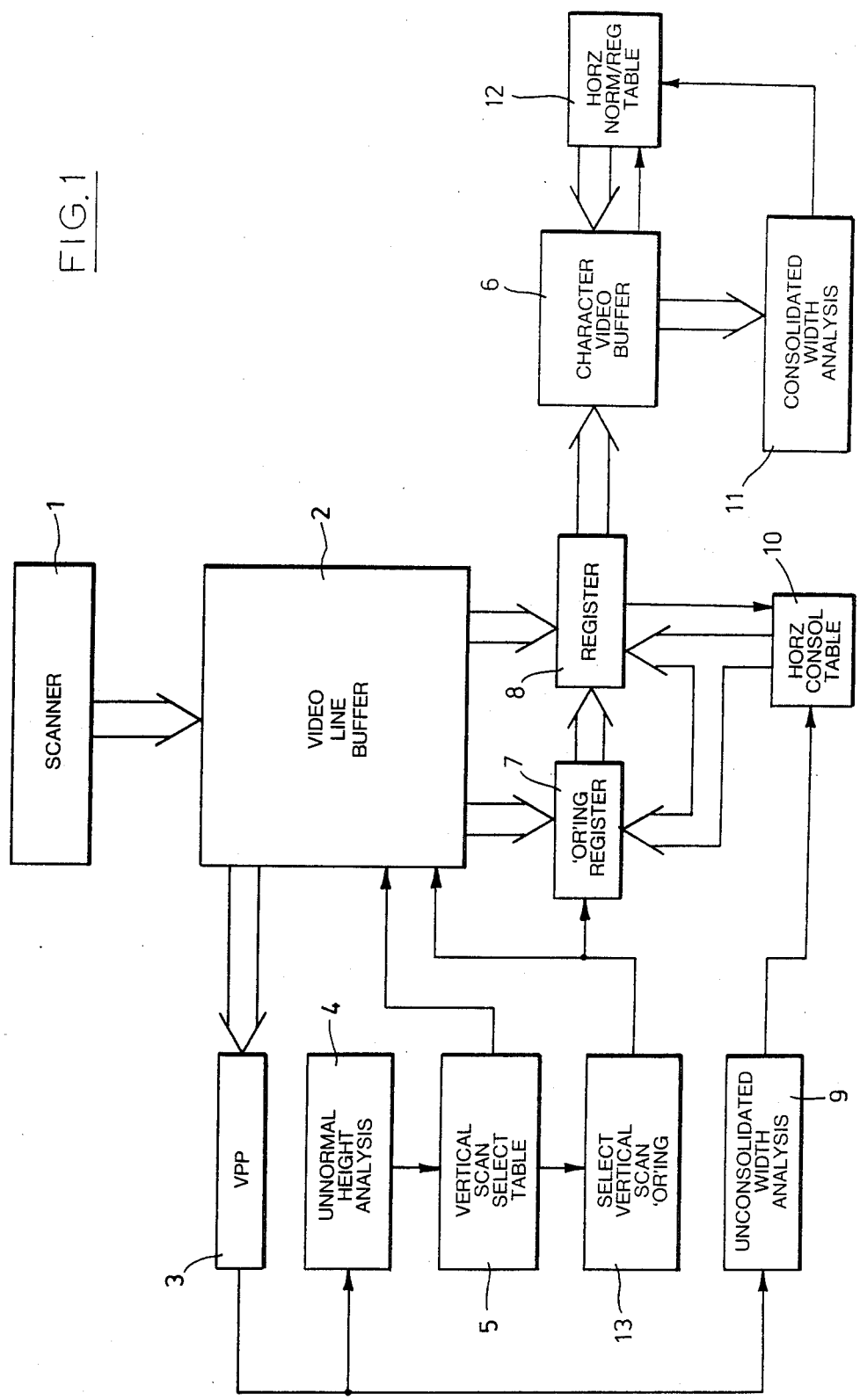
FIG. 1 is a schematic diagram of the character normalizing system.

As schematically shown in FIG. 1, a scanner 1 scans a document on which characters to be read have been hand printed. A digitized image of the document is transferred into a video line buffer 2, where it is retained as a matrix of bits. The matrix in the buffer is preprocessed by a video preprocessor 3 which selects portions of the matrix having character information for subsequent processing. The video preprocessor 3 separates the character information so that the location of the character is logically determined.

While the character is being preprocessed, an unnormalized height analysis 4 is undertaken to determine the height of the unconstrained character stored in the video line buffer 2. Having determined the height, the height information is then provided to a Vertical Scan Select table 5. The Vertical Scan Select Table 5 selects the rows of information in the video line buffer 2 which are to be retained or combined with other rows. Unselected rows are not retrieved from the video line buffer 2. During the preprocessing operation the width of the character also must be determined. In the present invention this is done by determining the left and right sides of the character within each separate character area logically determined during the video preprocessing. This width information is used to determine the span of the character, however, the sides of the character usually do not occur precisely on byte span boundaries. During this preprocessing of the width the actual byte spans containing bit representations of the character are determined. If it is found that the character bit representations are found in more byte spans than are necessary to contain the character, left or right justifying of the character to a byte span boundary may be performed. The horizontal compression of the character will be more readily understood from the subsequent description. In the preferred embodiment, the resulting consolidated character is constrained to 16 rows high by 16 bits wide. The description of this process will be more fully developed with reference to the following figures of drawings.

When the consolidated character is obtained, it is transferred to a character video buffer 6 where a further analysis is undertaken to determine the width of the consolidated character. It has been found that a character height of 16 bits and width of 13 bits best balances the need to obtain satisfactory recognition logic performance and a reasonable logic storage size. When the width of the consolidated character has been determined then certain specified bits of the character are deleted to provide a normalized character of the desired 13 bit width as will be more fully described hereinafter.

The process for identifying the character is not a part of this invention and may be achieved by any suitable process known in the art of character recognition. A description of the recognition process is not required for an understanding of the present invention.

Figure 2:
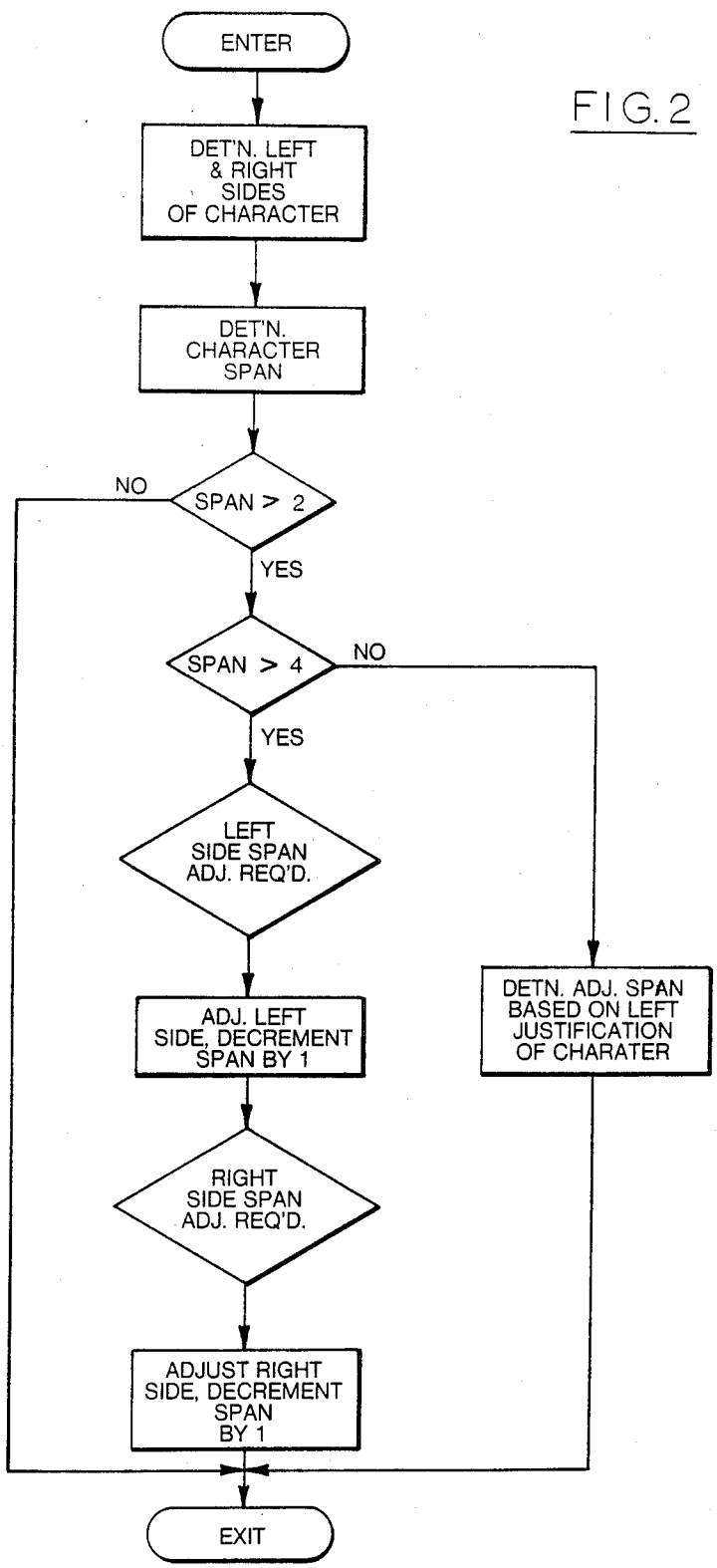
FIG. 2 shows, in a flow diagram, the normalization preanalysis of a character.

FIG. 2 shows the Normalization Preanalysis operation. The Normalization Preanalysis operation determines the height and width of the raw character in the video line buffer. The original document normally provides a predefined area in which the document originator may insert characters to be read. In the particular application for which the present invention was developed a maximum character size of 64 bits high and eight bytes wide is used, which is sufficient to contain a typical raw character.

When the Normalization Preanalysis operation is initiated the left and right sides of the character are detected and the character span of the character is determined. It should be noted that the sides of the character are detected within a byte span so that the operation simply detects the existence of a bit representative of character information within a byte to determine whether a particular byte includes information representative of the character. When the character span has been determined it is logically determined whether the span is greater than two. If the span is two or less no further analysis is required since the character width is already within the desired byte width for a consolidated character. If the span is greater than two but less than five then the character span is left justified so as to avoid the need for justification during the actual consolidation process. If the byte span is greater than four, a further attempt is made to reduce the byte span. In the first step, the left-most byte span is examined and if only a single bit is found in that span the left-most span is ignored and the span count is reduced by one. Similarly, the right-most span is examined and if it contains only a single bit it is also ignored and the byte span count is reduced by one.

As is readily apparent from the above description, it is important to adjust the character matrix for optimal span size. By analyzing the character on a span basis, it is possible to retain the benefits of microprocessor byte-by-byte addressing and at the same time, reduce the apparent width of the character by eliminating those areas which in fact carry very little, if any, information on the shape of the character. Measuring the span width and decrementing of the span width count where possible enables adoption of the simple and effective horizontal consolidation approach developed by the present inventors. Of course, it is also readily apparent to one skilled in the art that the approach adopted by the present inventors can be reversed and the horizontal could be treated as the vertical and the vertical as the horizontal, if desired.

Having determined the span width of the character, the normalization process itself can be undertaken as shown by the flow charts provided in FIGS. 3A and 3B. The normalization process is started by clearing a register to receive a consolidation profile of the consolidated character to be recognized. The consolidation profile is contained on a register in which each consolidated row is successively OR'ed so that when all rows have been selected the register containing the consolidated profile will represent the actual width of the consolidated character and show those bits in the consolidated byte span containing no character information so that a determination can readily be made as to whether any bit deletion is required to obtain a character width of 13 bits. The consolidated profile also indicates whether left justification of the consolidated character is required.

After the register containing the consolidation profile has been cleared at the start of the normalization process a loop counter is set to 16 which is the desired height of the character. Next the actual height of the character in the video line buffer 2 is used to obtain selection of the particular rows of the unconsolidated character which will be used in the horizontal consolidation and formation of the ultimate representation of the character in normalized form. We will first discuss the situation in which the character is 16 or fewer rows in height.

When the character is determined to be less than 16 rows in height, a loop end counter is set to 16 less the character height. Then the first row of the character is selected and horizontally consolidated in accordance with the Horizontal Consolidation diagrams in FIGS. 6 and 7 and the Horizontal Consolidation Table shown in Appendix A. For ease of understanding, only the portion of the Horizontal Consolidation Table used in consolidating the hand printed character "6" shown in FIG. 5A is given in the Table. Completion of the full table is quite straightforward as the table is merely a reconstruction of the logical results which would arise from the OR'ed combination of either two or four bits as appropriate. Where the character is 16 or fewer rows high, all rows of the character are retained in the output, and therefore no vertical normalization of the character is required. If the row has a span of two bytes or less, then no horizontal consolidation of the row is required either and the row bits are passed to the next phase of the normalization operation unchanged. If the span is greater than two bytes wide, then it is consolidated in accordance with the diagrams shown in FIGS. 6 and 7. For example, if the span was 3 bytes wide, the first byte 131 of 8 bits would be reduced to 4 bits and shifted to the right 4 bits by the use of the 8/4 bit table 06 and stand in a register. The reduction is accomplished by essentially OR'ing together bits 1 and 2, bits 3 and 4, bits 5 and 6 and bits 7 and 8 in the byte and providing a transformed 4 bit representation which includes all the black information sensed for that portion of the character. This OR'ing operation is performed by using the Horizontal Consolidation Tables as partially shown in Appendix A. The black portion of the character is usually indicated by ones in the bit stream whereas white portions are represented by zeros. The 8 bits of the middle byte 132 of the three span character are transposed unchanged to the last 8 positions in the row and the third byte 133 is again reduced to 4 bits by the use of the 8/4 bit table 05 and moved from the right hand side to the left hand side of the bit span so that it is now represented by the first 4 bits of the character. By OR'ing together the outputs of tables 06 and 05 the desired 8 bit byte shown at 134 is obtained. This is done to maintain byte boundary integrity so that the transformed character can be byte addressed. Of course, to get the proper orientation of the character row it is necessary to rotate the first four bits of the representation to the position of the last four bits and shift the remaining 12 bits four positions forward which is achieved by a rotate function in a manner which is well known to those skilled in this art. In this manner, a span of 3 bytes is reduced to 2 bytes which is the desired width of the character. Similar transformations are performed for spans of 4, 5, 6, 7 and 8 bytes as shown in the diagrams in FIG. 7. The particular transformations shown in the diagrams have been found to operate very satisfactorily on the hand printed characters of the alphabets to which the inventors have applied it. However, it is readily apparent that other means of compressing the row information may be equally satisfactory. The sole purpose of this consolidation step is to reduce a row of bits having a width exceeding two bytes to a width of only two bytes while retaining essential information. The resulting consolidated string of bits is stored in the character video buffer 6.

The inventors have found that the actual horizontal consolidation can be much more rapidly accomplished by using horizontal consolidation tables, as is partially illustrated in the Table in Appendix A. The use of these tables will be more fully described hereinafter.

We return now to FIG. 3A and will note that after the horizontal consolidation has been completed for each row, the resulting consolidated bit string is also OR'ed into the register containing the consolidation profile. After all the horizontal rows have been OR'ed into this register the register will retain data on the actual bits containing character information in the Character Video Buffer 6.

After each row has been OR'ed into the register containing the consolidation profile, the loop counter is decremented by one and the count in the loop counter is compared to the count in the loop end counter. If it is determined that the count in the loop counter remains the greater, then the process is repeated with the next row of the character information. When the count in the loop counter reaches the count in the loop end counter the scan mechanism is reset to a scan equal to zero and the loop counter is decremented by one. These steps are repeated until the loop counter is also reduced to a count of zero at which time the register containing the consolidated profile will contain an actual measure of the character width so that the horizontally consolidated information stored in the Character Video Buffer 6 can be normalized to the required 13 bit width as shown in FIG. 4.

For completion of the horizontal normalization process the character width is determined from the result stored in the register containing the consolidated profile. After the width has been determined it is necessary to determine whether justification of the consolidated character is required. If the character is not properly justified then information useful in identifying the character could be deleted and useless information retained during the horizontal normalization process. The left justification process is initiated by determining whether the original character width as determined during the Normalization Preanalysis (see FIG. 2) was three or four bytes wide. If the original span was three or four bytes wide then no justification will be required because the original byte span was left justified during the normalization preanalysis procedure. Since the whole concept of the present invention is to retain all colour information by OR'ing adjacent bits together, the left justification of the three or four span character during the Normalization Preanalysis will lead to the existence of at least one significant bit in the first column of at least one row of the consolidated character. However, if the original character had a span greater than four then the left justification of the consolidated character is required to remove all columns at the left side of the character which contain no character information. The register containing the Consolidation Profile provides the means to determine how far each row can be left justified since it will contain zeros in the bit positions in which none of the rows contain character information. Therefore, left justification can occur up to the point that the Consolidation Profile Register first indicates the existence of a bit representative of character information. After being left justified, if the consolidated width as determined in the Consolidated Width Analysis 11, is less than or equal to 13, no change in the character information is made. If the bit width is equal to 14, the ninth bit in each row of the consolidated character is deleted to provide the character information in a 13 bit width. If the width is found to be equal to 15, the sixth and ninth bits are deleted, and if the bit width is found to be greater than 15, i.e., 16, then bits 6, 9 and 11 are deleted so that in each case a row of 13 bits is obtained. This deletion of bits is performed by the Horizontal Normalization/Registration Table 12 as directed by the Consolidated Width Analysis processor 11.

Although it is readily apparent that one could use a 16 bit width to perform the character recognition operation, it is obviously more desirable to use a smaller character width if reliable recognition can be achieved. The present inventors have determined that a 13 bit width character constructed in the manner described herein can give very accurate character recognition results at reduced cost and with a speed improvement over character recognition processes using a greater character width.

We will now return to the situation where the height of the character is greater than 16 rows.

When it is determined that the character height is greater than 16, the character information is processed in the manner shown in FIG. 3B. The first scan line of the character is selected in accordance with a Vertical Scan Select Table 5 which is more fully shown in Appendix B. The detected unnormalized height analysis 4 addresses the Vertical Scan Select Table 5 to obtain scan information from the table. For example, if the character height was 27 rows, then rows 1, 3, 5, 6, 8, 10, 11, 13, 15, 16, 18, 20, 21, 23, 25 and 26 in the Video Line Buffer 2 would be selected to represent the normalized form of the character. If the character were 40 rows high, row 2 would be selected, rows 4 and 5 would be OR'ed together in the "OR"ing register 7 and selected, row 7 would be selected, rows 9 and 10 OR'ed together and selected, row 12 selected, rows 14 and 15 OR'ed together and selected, row 17 selected, rows 19 and 20 OR'ed together and selected, row 22 selected, rows 24 and 25 OR'ed together and selected, row 27 selected, rows 29 and 30 OR'ed together and selected, row 32 selected, rows 34 and 35 OR'ed together and selected, row 37 selected, rows 39 and 40 OR'ed together and selected to provide a character having a height of 16 rows. Each selected row is transferred to the Register 8, either directly from the Video Line Buffer 2 or through the OR'ing register 7. As the rows are selected, the Horizontal Consolidation is performed in accordance with the width analysis 9 so that the Register 8 transfers a vertically and horizontally consolidated character a row at a time to the Character Video Buffer 6. In the preferred embodiment the actual character image transferred would be 16 rows high and 16 bits wide.

As indicated in FIG. 3B, after the row has been selected, a determination is made whether any OR'ing is required. If OR'ing is required, the current scan is OR'ed with the next scan. If no OR'ing is required, then the horizontal consolidation is initiated directly as in the case of character heights of less than 16 rows. The resulting horizontally consolidated row is also OR'ed into the register containing the Consolidated Profile as was previously described for character heights of 16 rows or less. The process is continued until the loop counter is reduced to zero and the next character is selected for processing. The horizontal normalization of each row is performed in the same manner as for consolidated rows of characters 16 or less as shown in FIG. 4.

Having briefly described the consolidation and normalization process, we will now refer to FIG. 5A to 5E which demonstrate the effect of the consolidation and normalization process on a hand printed representation of the number "6".

FIG. 5A shows the character as it is received in the video line buffer 2 prior to any Normalization Preanalysis. The height of the character is measured and found to be 40 rows as shown in FIG. 5B. At the same time the width or span of the character is tentatively determined to be 5, although the fifth byte is only sparsely filled. When it has been determined that the character height is 40, the Vertical Scan Select Table 5 (see the Table in Appendix B) is accessed for a character height of 40. The rows of the character are selected in accordance with the selections indicated in the Vertical Scan Select tables in Appendix B. Rows 2, 4 and 5, 7, 9 and 10, 12, 14 and 15, 17, 19 and 20, 22, 24 and 25, 27, 29 and 30, 32, 34 and 35, 37, 39 and 40 are selected and combined and would provide the representation in FIG. 5C. It should be noted, however, that in the process actually described herein an actual representation of the full character as shown in FIGS. 5B and 5C would never exist as each row is consolidated to the form shown in FIG. 5D before the next row is accessed. The result is a character 16 rows high having a span of 5 as shown in FIG. 5C. However, only a single bit appears in span byte 5 and as this provides little if any valuable information as to the identity of the character, it is ignored and the horizontal consolidation is undertaken on the basis of a span of 4.

Figure 7A:
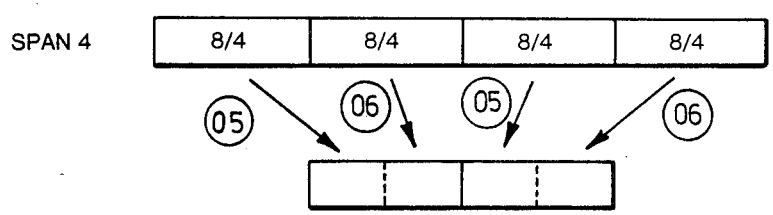
Figure 7A:
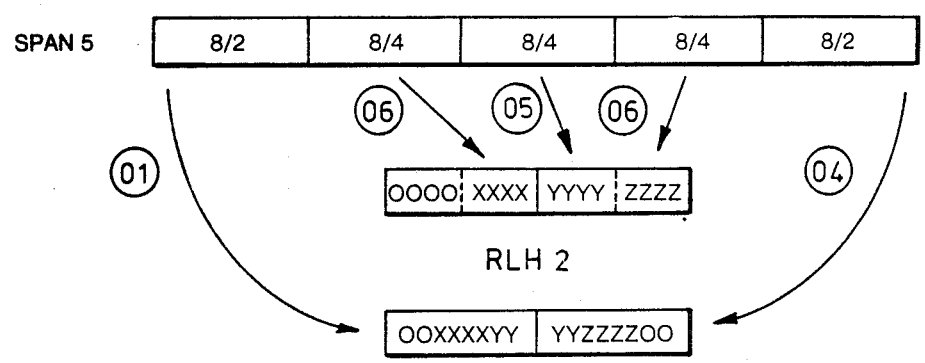
Figure 8A:
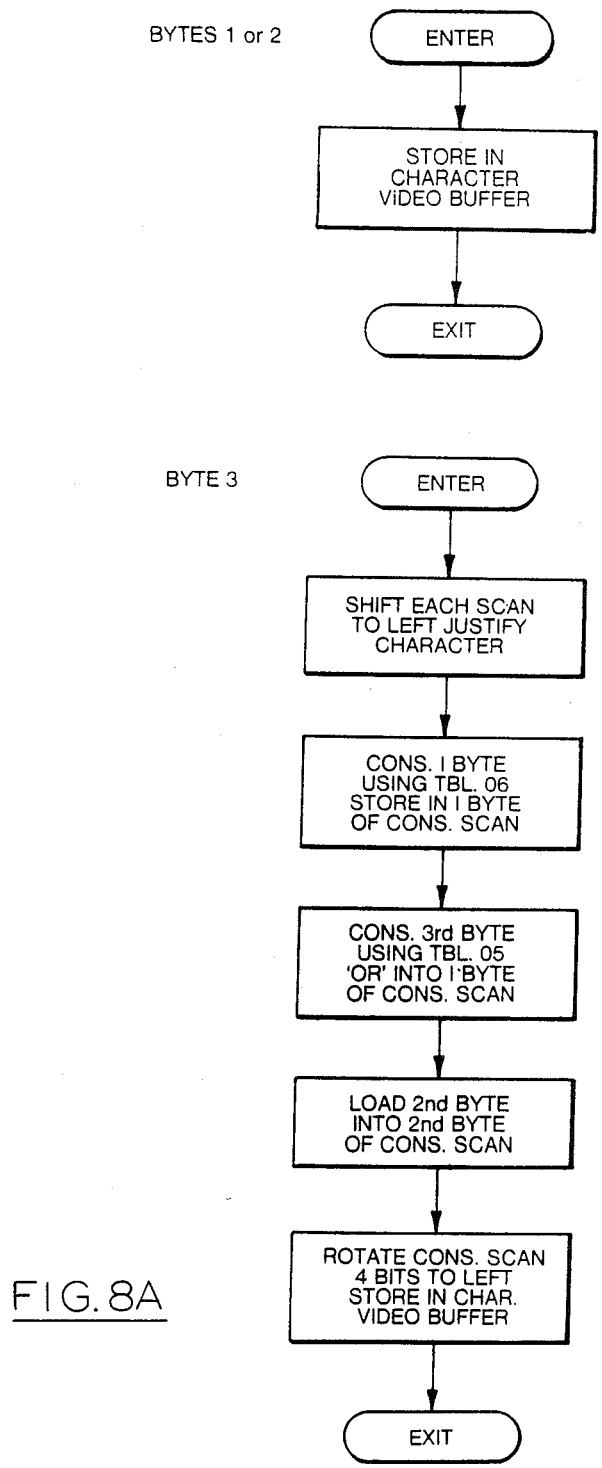
Figure 8B:
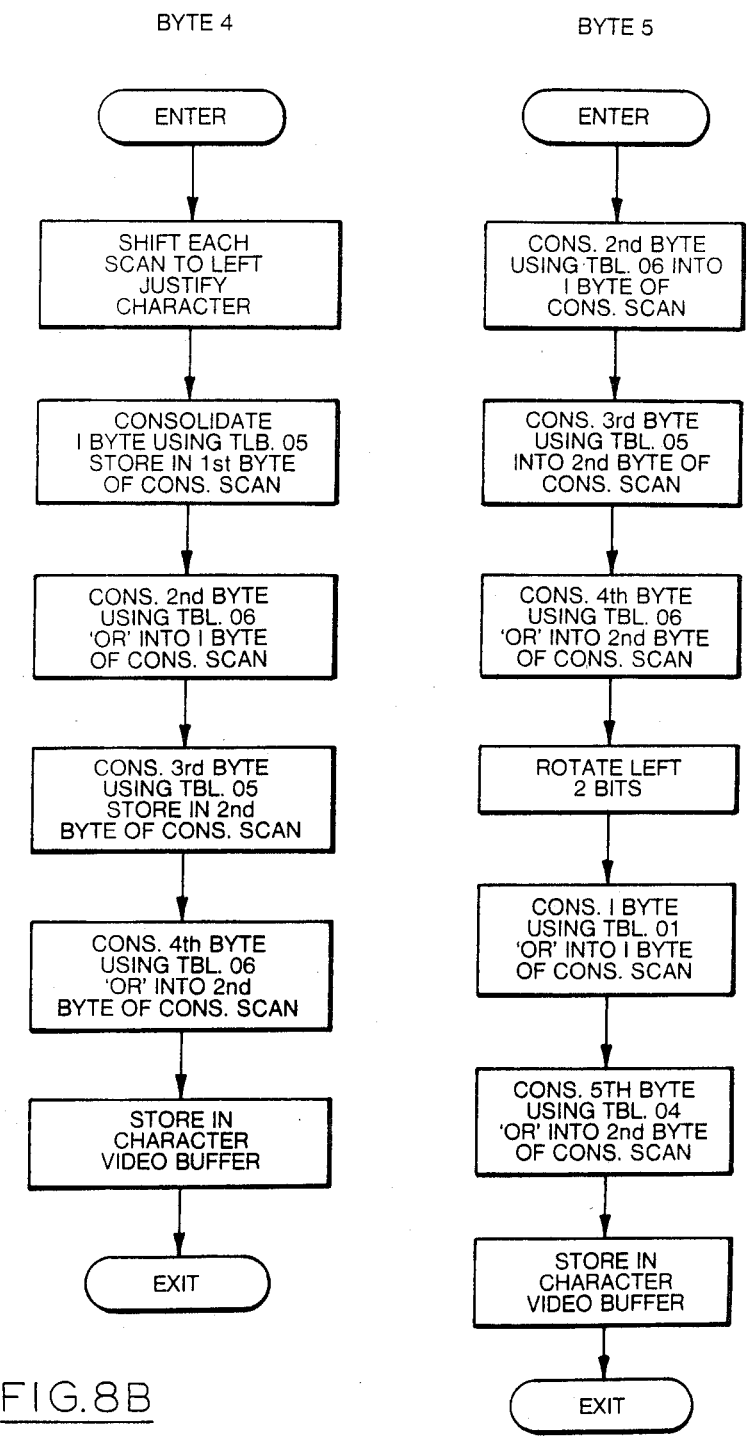
Figure 8C:
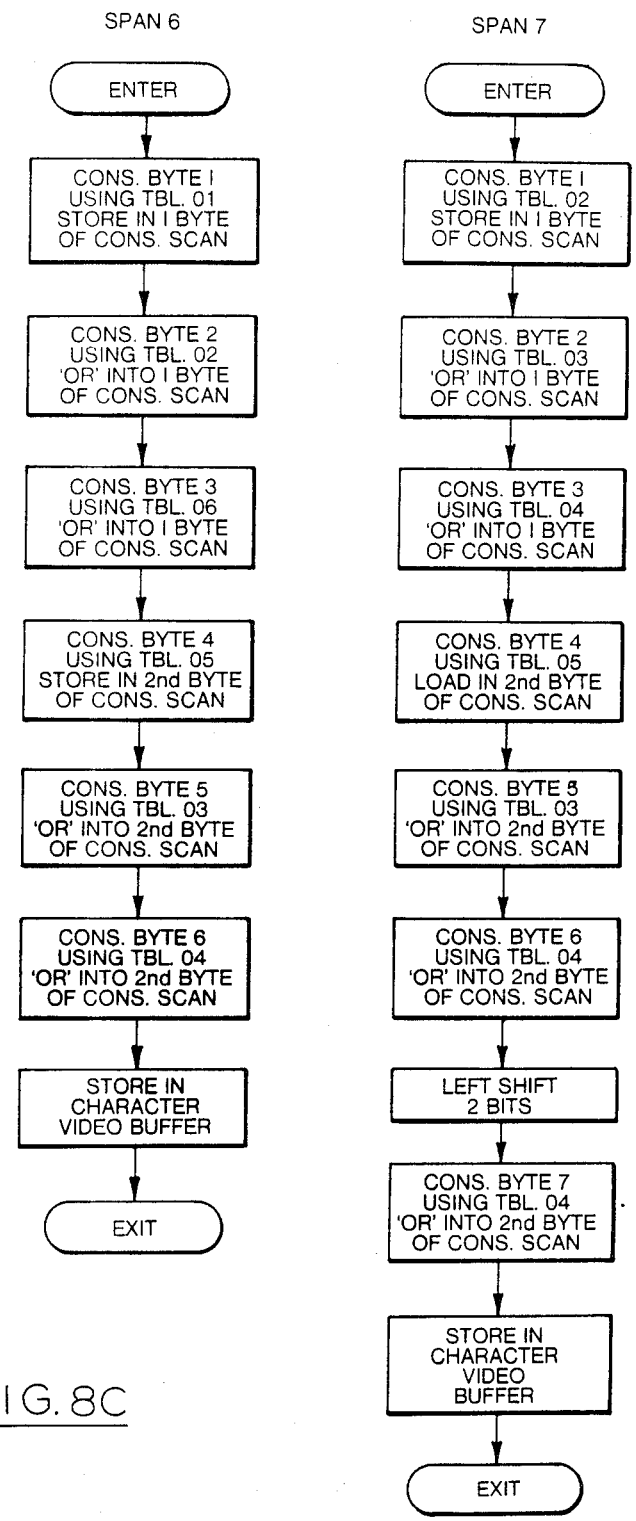
Figure 8D:
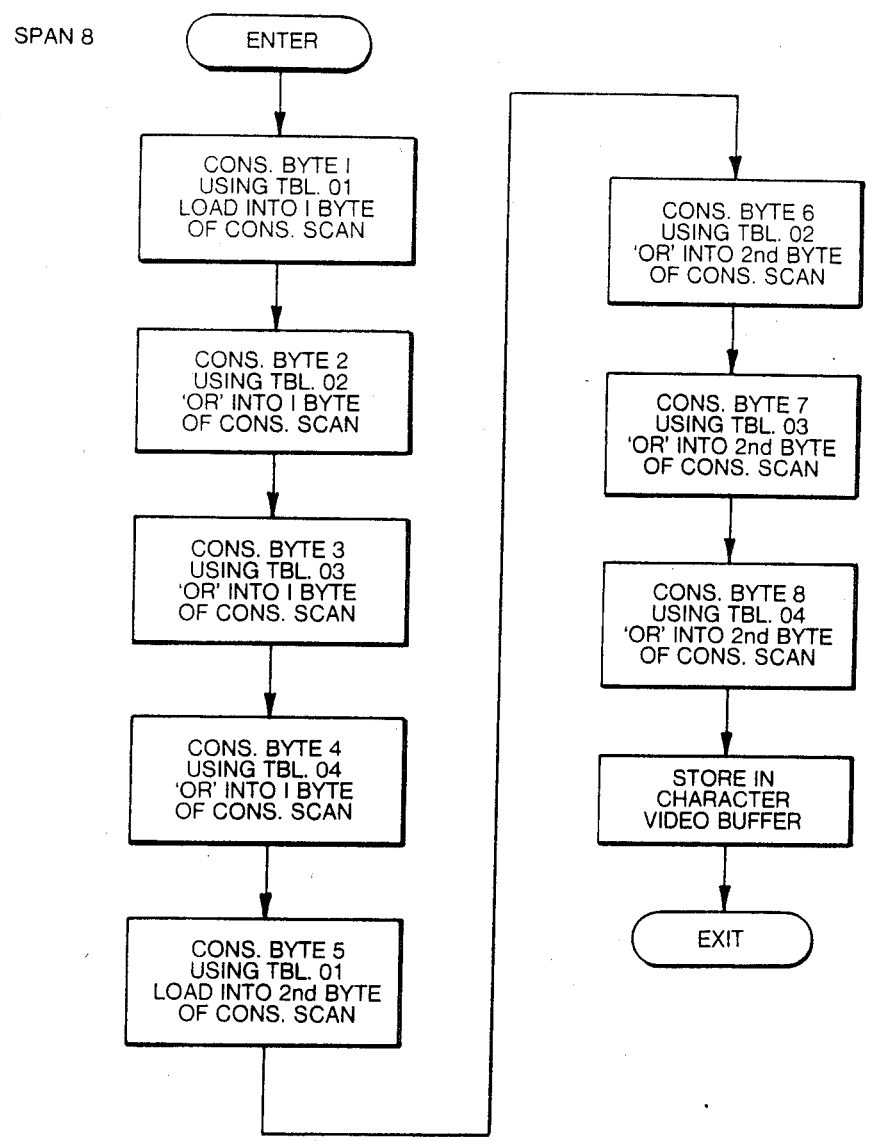

The horizontal consolidation process for a character having a span of 4 is implemented in accordance with the charts shown in FIGS. 6 and 7. As indicated in FIG. 7, each 8 bit byte in a 4 byte row is reduced to a 4 bit code. For example, in the case of the first row of the character "6" in FIG. 5C, no information is found in the first, second or third bytes. These bytes are each reduced from 8 zero bits to 4 zero bits, as shown in row 1 of FIG. 5D. The fourth byte consists of three zeros or blank areas followed by five ones or black areas. The result is a 4 bit portion in which the first bit is a blank area and the next three bits are black or ones.

The horizontal consolidation can either be achieved by OR'ing adjacent bits together or by a table look-up process. In the present invention, the table look-up process is preferred. Portions of the horizontal consolidation table used in consolidating the character "6" shown in FIG. 5A are shown in Appendix A. For the first three bytes of row one of the number "6" here to be identified, the input byte is a series of 8 zeros and the first row of the consolidation table is addressed. For the first byte, the output from Table 05 is selected. Table 05 provides an output of 8 bits in which the first four bits are the result of OR'ing adjacent bits in the input byte and the last four bits are zeros as shown in FIG. 6. For the second byte, the output from Table 06 is selected and OR'ed with the first output byte to provide a single byte of 8 bits. Table 06 provides an output of 8 bits in which the first four bits are zeros and the last four bits are the result of OR'ing adjacent bits in the input byte. Combining the outputs of Tables 05 and 06 provides an 8 bit byte which represents the result of OR'ing adjacent bits in the two input bytes. For the third byte, Table 05 is again selected but the so selected byte is stored in the second byte of the consolidated scan in the Character Video Buffer and for the fourth byte, Table 06 is again selected and OR'ed with the second byte of the consolidated scan. In the present example, the fourth byte is 00011111 and results in the selection from Table 06 of the byte 00000111 which is OR'ed with the byte 00000000 resulting in the row representation shown in FIG. 5D.

After the horizontal and vertical consolidation has been completed, the actual width of the resulting character is measured as previously indicated. In the present instance, it has been found that the character is 15 bits wide and therefore bits 6 and 9 are deleted from the character providing the resulting representation of "6" as shown in FIG. 5E. This is the normalized form of the character which is retained in the character video buffer 6 for subsequent analysis and recognition.

The inventors have devised a particular set of vertical and horizontal rules which have been found very useful in retaining information about the character essential to its recognition. However, one skilled in the art could devise an equally successful set of alternative rules using the teaching of the present invention to select the appropriate rules. For example, the binary representation of the unconstrained hand printed character "6", described hereinbefore, is forty rows high and thirty-three columns wide. The present inventors, under their described rules, deleted rows 1 and 3, retained row 2 and combined rows 4 and 5. Another skilled person might decide to retain rows 3 and 5 and delete rows 1, 2 and 4. Similarly, when the present inventors reduced each row to a width of sixteen, each bit was OR combined with the adjacent bit and the last bit in the fifth byte span was ignored. Another person skilled in the art might decide to group the bits together in another manner to obtain the required reduction. For example, the first and fourth group of eight bits might be reduced to two bits each, the second group of eight bits retained unchanged and the third group of eight bits reduced to four bits. The last bit would be dropped again leaving a group of sixteen bits but using a different selection process. Such a selection, although not optimal for the present inventors' general application, could be desirable for other specific recognition applications.

The use of the consolidation tables for horizontal consolidation will be more apparent by further reference to FIGS. 6 and 7. FIG. 6 shows the transformation of an 8 bit byte into either two or four bit portions. The bit Table 01 is used where the eight bits are to be transformed into two bits by OR'ing together the bits in two groups of four and providing the result as the first two bits of a new byte. Tables 02, 03 and 04 perform similar functions, however in these instances the bits are transformed into different positions in the byte word as indicated by the "X" representations. In this manner, the outputs of tables 01, 02, 03 and 04 can be combined to provide an 8 bit output or byte which is the OR'ed combination of 8 groups of 4 bits each or 4 bytes and thereby provide a consolidation of 4 bytes into a single byte. Bit Tables 05 and 06 are used to transform an eight bit byte into four bits by OR'ing adjacent bits in the byte. Bit Table 05 forms the first half of the byte word whereas Bit Table 06 forms the second half. Obviously by combining in an OR'ing fashion, the results of Bit Tables 01, 02, 03 and 04 or Bit Tables 05 and 06, a single byte, representative of the information resulting from the transformation, may be obtained.

FIG. 7 shows how the consolidation is performed for each span width. In the case of a span width of one or two, no change is required as the character representation is already 16 or fewer bits wide. In the case of a span of three, the first byte is transformed into four bits by using table 06, the second byte is unchanged and the third byte is transformed into four bits using table 05. The bits resulting from the first two bytes are shifted to the right four bit positions and the bits resulting from the last byte are transposed to the left of the first byte. The resulting two bytes are then rotated to the left four bit positions to obtain the consolidated row of the three bytes in the correct order. In the case of a span of four, each byte is transformed into four bits. The first and third bytes use Table 05 and the second and fourth bytes use Table 06.

FIGS. 8A to 8D show, in flow diagram form, the process for horizontally consolidating rows of different widths. In the case of rows of only 1 or 2 byte widths, the row is passed through the Register 8 to the Character Video Buffer 6 for storage without change.

For a byte span of 3, the scan is left justified and the first byte is consolidated using Table 06 and stored in the first byte of the consolidated scan. The tables 01 to 06 are stored in the Horizontal Consolidation Table 10. Using Table 06 instead of Table 05 ensures that the consolidated byte information is stored in the four low order positions of the output byte. Next the third byte is consolidated using Table 05 and OR'ed with the byte already stored in the first byte of the consolidated scan. Finally, the second byte is transferred unchanged to the second byte of the consolidated scan. The resulting two byte row is rotated four bit positions to the left in a manner well-known in the art so that the first four positions of the scan all rotate to the last four positions of the scan and the remaining bits are each shifted forward four bit positions so that the character information is retained in its proper order. This process does not require any addressing below the byte level and therefore, retains the byte addressing capability of a microprocessor.

In the case of a byte span of 4, each scan is shifted to the left to justify the character and each byte is reduced to four bits. The first byte is consolidated using Table 05 and stored in the first byte of the consolidated scan. The second byte is consolidated using Table 06 and stored in the first byte of the consolidated scan. The third and fourth bytes are consolidated using Tables 05 and 06, respectively, and stored in the second byte of the consolidated scan. The two byte consolidated scan is stored in the Character Video Buffer 6.

For a byte span of 5, the second byte is consolidated into the first byte of the consolidated scan using Table 06. The third byte is consolidated into the second byte of the consolidated scan using Table 05 and the fourth byte is consolidated into the second byte of the consolidated scan using Table 06. The resulting consolidated scan of twelve bits is then rotated left two bits to provide a consolidated scan in which the first two and last two bits are zeroes. Now the first byte of the input row is consolidated using Table 01 and OR'ed into the first byte of the consolidated span. The fifth byte is then consolidated using Table 04 and OR'ed into the senond byte of the consolidated scan. The resulting consolidated scan of sixteen bits is stored in the Character Video Buffer 6.

For a span of six bytes, the first byte is consolidated using Table 01 and stored in the first byte of the consolidated scan. The second byte is consolidated using Table 02 and also OR'ed into the first byte of the consolidated scan. The third byte is consolidated using Table 06 and OR'ed into the first byte of the consolidated scan. This provides the eight bits for the first byte of the consolidated scan. The fourth, fifth and sixth bytes are consolidated using Tables 05, 03 and 04, respectively, and stored in the second byte of the consolidated scan. The resulting consolidated scan is stored in the Character Video Buffer 6.

In the case of a span of seven bytes, the first byte is consolidated using Table 02 and OR'ed into the first byte of the consolidated scan. The second and third bytes are consolidated using Tables 03 and 04, respectively, and also stored in the first byte of the consolidated scan. This provides a first byte of the consolidated scan having zero bits in the first two positions and information representative bits in the remaining six bit positions. The fourth, fifth and sixth bytes are consolidated using Tables 05, 03 and 04, respectively, and stored in the second byte of the consolidated scan. The result so far is shifted left two bit positions so that the first two bit positions of the first byte are filled and the last two bit positions of the second byte are empty. The seventh byte is then consolidated using Table 04 and OR'ed into the second byte of the shifted consolidated scan to fill the second byte. The resulting consolidated scan is stored in the Character Video Buffer 6.

For a row that spans eight bytes, the first, second, third and fourth bytes are consolidated into the first byte of the consolidated scan using Tables 01, 02, 03 and 04, respectively. The fifth, sixth, seventh and eighth bytes are similarly consolidated into the second byte of the consolidated scan using the tables 01, 02, 03 and 04, respectively, to provide a two byte consolidated scan which is stored in the Character Video Buffer 6.

From the above detailed description of the horizontal consolidation process for each byte width it is evident that a character representation two bytes wide is initially stored in the Character Video Buffer 6. As has been described hereinbefore, this two byte width is further reduced to 13 bits as described and shown with reference to the flow diagrams given in FIG. 4.

As the maximum width contemplated for an unnormalized character is eight bytes or 64 bits, further tables have not been developed. It should also be recognized that although the particular arrangements disclosed herein have been found particularly advantageous by the present inventors, it is possible to conceive other arrangements which would provide equally valid results and the inventors should not be limited to the particular arrangements disclosed but are restricted only by the limitations in the claims appended hereto.

APPENDIX A

HORIZONTAL CONSOLIDATION TABLES

| INPUT BYTE | ANY OF FOUR CONSOLIDATION | | | | ANY OF TWO CONSOLIDATION | |
|---|---|---|---|---|---|---|
| | TABLE 01 | TABLE 02 | TABLE 03 | TABLE 04 | TABLE 05 | TABLE 06 |
| 00000000 | 00000000 | 00000000 | 00000000 | 00000000 | 00000000 | 00000000 |
| 00000001 | 01000000 | 00010000 | 00000100 | 00000001 | 00010000 | 00000001 |
| 00000011 | 01000000 | 00010000 | 00000100 | 00000001 | 00010000 | 00000001 |
| 00000111 | 01000000 | 00010000 | 00000100 | 00000001 | 00110000 | 00000011 |
| 00001110 | 01000000 | 00010000 | 00000100 | 00000001 | 00110000 | 00000011 |
| 00001111 | 01000000 | 00010000 | 00000100 | 00000001 | 00110000 | 00000011 |
| 00011000 | 11000000 | 00110000 | 00001100 | 00000011 | 01100000 | 00000110 |
| 00011100 | 11000000 | 00110000 | 00001100 | 00000011 | 01100000 | 00000110 |
| 00011110 | 11000000 | 00110000 | 00001100 | 00000011 | 01110000 | 00000111 |
| 00011111 | 11000000 | 00110000 | 00001100 | 00000011 | 01110000 | 00000111 |
| 00111100 | 11000000 | 00110000 | 00001100 | 00000011 | 01100000 | 00000110 |
| 00111110 | 11000000 | 00110000 | 00001100 | 00000011 | 01110000 | 00000111 |
| 00111111 | 11000000 | 00110000 | 00001100 | 00000011 | 01110000 | 00000111 |
| 01110000 | 10000000 | 00100000 | 00001000 | 00000010 | 11000000 | 00001100 |
| 01111000 | 11000000 | 00110000 | 00001100 | 00000011 | 11100000 | 00001110 |
| 01111100 | 11000000 | 00110000 | 00001100 | 00000011 | 11100000 | 00001110 |

APPENDIX A-continued

HORIZONTAL CONSOLIDATION TABLES

| | ANY OF FOUR CONSOLIDATION | | | | ANY OF TWO CONSOLIDATION | |
|---|---|---|---|---|---|---|
| INPUT BYTE | TABLE 01 | TABLE 02 | TABLE 03 | TABLE 04 | TABLE 05 | TABLE 06 |
| 01111111 | 11000000 | 00110000 | 00001100 | 00000011 | 11110000 | 00001111 |
| 10000000 | 10000000 | 00100000 | 00001000 | 00000010 | 10000000 | 00001000 |
| 10000011 | 11000000 | 00110000 | 00001100 | 00000011 | 10010000 | 00001001 |
| 11000000 | 10000000 | 00100000 | 00001000 | 00000010 | 10000000 | 00001000 |
| 11100000 | 10000000 | 00100000 | 00001000 | 00000010 | 11000000 | 00001100 |
| 11100011 | 11000000 | 00110000 | 00001100 | 00000011 | 11010000 | 00001101 |
| 11110000 | 10000000 | 00100000 | 00001000 | 00000010 | 11000000 | 00001100 |
| 11111000 | 11000000 | 00110000 | 00001100 | 00000011 | 11100000 | 00001110 |
| 11111100 | 11000000 | 00110000 | 00001100 | 00000011 | 11100000 | 00001110 |
| 11111110 | 11000000 | 00110000 | 00001100 | 00000011 | 11110000 | 00001111 |

APPENDIX B

VERTICAL SCAN SELECT TABLE

16 < HEIGHT < =32

| HT=17 | HT=18 | HT=19 | HT=20 | HT=21 | HT=22 | HT=23 | HT=24 | HT=25 | HT=26 | HT=27 | HT=28 |
|---|---|---|---|---|---|---|---|---|---|---|---|
| 1 | 1 | 1 | 1 | 1 | 1 | 1 | 1 | 1 | 1 | 1 | 1 |
| 2 | 2 | 2 | 2 | 2 | 2 | 2 | 2 | 3 | 3 | 3 | 3 |
| 3 | 3 | 3 | 3 | 3 | 4 | 4 | 4 | 4 | 4 | 5 | 5 |
| 4 | 4 | 4 | 4 | 5 | 5 | 5 | 5 | 6 | 6 | 6 | 6 |
| 5 | 5 | 5 | 6 | 6 | 6 | 7 | 7 | 7 | 8 | 8 | 8 |
| 6 | 6 | 7 | 7 | 7 | 8 | 8 | 8 | 9 | 9 | 10 | 10 |
| 7 | 7 | 8 | 8 | 9 | 9 | 10 | 10 | 10 | 11 | 11 | 12 |
| 8 | 8 | 9 | 9 | 10 | 10 | 11 | 11 | 12 | 12 | 13 | 13 |
| 9 | 10 | 10 | 11 | 11 | 12 | 12 | 13 | 14 | 14 | 15 | 15 |
| 10 | 11 | 11 | 12 | 13 | 13 | 14 | 14 | 15 | 16 | 16 | 17 |
| 11 | 12 | 13 | 13 | 14 | 15 | 15 | 16 | 17 | 17 | 18 | 19 |
| 12 | 13 | 14 | 14 | 15 | 16 | 17 | 17 | 18 | 19 | 20 | 20 |
| 13 | 14 | 15 | 16 | 17 | 17 | 18 | 19 | 20 | 21 | 21 | 22 |
| 14 | 15 | 16 | 17 | 18 | 19 | 20 | 20 | 21 | 22 | 23 | 24 |
| 15 | 16 | 17 | 18 | 19 | 20 | 21 | 22 | 23 | 24 | 25 | 26 |
| 16 | 17 | 18 | 19 | 20 | 21 | 22 | 23 | 24 | 25 | 26 | 27 |

16 < HEIGHT < =32 / 32 < HEIGHT < =64

| HT=29 | HT=30 | HT=31 | HT=32 | HT=33 | | HT=34 | | HT=35 | | HT=36 | | HT=37 | | HT=38 | | HT=39 | | HT=40 | |
|---|---|---|---|---|---|---|---|---|---|---|---|---|---|---|---|---|---|---|---|
| 1 | 1 | 1 | 1 | 2 | 0 | 2 | 0 | 2 | 0 | 2 | 0 | 2 | 0 | 2 | 0 | 2 | 0 | 2 | 0 |
| 3 | 3 | 3 | 3 | 4 | 0 | 4 | 0 | 4 | 0 | 4 | 0 | 4 | 0 | 4 | 0 | 4 | 0 | 4 | 5 |
| 5 | 5 | 5 | 5 | 6 | 0 | 6 | 0 | 6 | 0 | 6 | 0 | 6 | 0 | 6 | 0 | 6 | 7 | 7 | 0 |
| 7 | 7 | 7 | 7 | 8 | 0 | 8 | 0 | 8 | 0 | 8 | 9 | 8 | 0 | 8 | 9 | 9 | 0 | 9 | 10 |
| 9 | 9 | 9 | 9 | 10 | 0 | 10 | 0 | 10 | 0 | 10 | 0 | 11 | 0 | 11 | 0 | 11 | 12 | 12 | 0 |
| 10 | 11 | 11 | 11 | 12 | 0 | 12 | 0 | 12 | 13 | 13 | 0 | 13 | 0 | 13 | 14 | 14 | 0 | 14 | 15 |
| 12 | 13 | 13 | 13 | 14 | 0 | 14 | 0 | 15 | 0 | 15 | 0 | 15 | 16 | 16 | 0 | 16 | 17 | 17 | 0 |
| 14 | 14 | 15 | 15 | 16 | 0 | 16 | 17 | 17 | 0 | 17 | 18 | 18 | 0 | 18 | 19 | 19 | 0 | 19 | 20 |
| 16 | 16 | 17 | 17 | 18 | 0 | 19 | 0 | 19 | 0 | 20 | 0 | 20 | 0 | 21 | 0 | 21 | 0 | 22 | 0 |
| 18 | 18 | 19 | 19 | 20 | 0 | 21 | 0 | 21 | 0 | 22 | 0 | 22 | 23 | 23 | 0 | 23 | 24 | 24 | 25 |
| 19 | 20 | 21 | 21 | 22 | 0 | 23 | 0 | 23 | 24 | 24 | 0 | 25 | 0 | 25 | 26 | 26 | 0 | 27 | 0 |
| 21 | 22 | 23 | 23 | 24 | 0 | 25 | 0 | 26 | 0 | 26 | 27 | 27 | 0 | 28 | 0 | 28 | 29 | 29 | 30 |
| 23 | 24 | 25 | 25 | 26 | 0 | 27 | 0 | 28 | 0 | 29 | 0 | 29 | 30 | 30 | 0 | 31 | 0 | 32 | 0 |
| 25 | 26 | 27 | 27 | 28 | 0 | 29 | 0 | 30 | 0 | 31 | 0 | 32 | 0 | 32 | 33 | 33 | 34 | 34 | 35 |
| 27 | 28 | 29 | 29 | 30 | 0 | 31 | 0 | 32 | 0 | 33 | 0 | 34 | 0 | 35 | 0 | 36 | 0 | 37 | 0 |
| 28 | 29 | 30 | 31 | 32 | 33 | 33 | 34 | 34 | 35 | 35 | 36 | 36 | 37 | 37 | 38 | 38 | 39 | 39 | 40 |

32 < HEIGHT < =64

| HT=41 | | HT=42 | | HT=43 | | HT=44 | | HT=45 | | HT=46 | | HT=47 | | HT=48 | | HT=49 | | HT=50 | | HT=51 | | HT=52 | |
|---|---|---|---|---|---|---|---|---|---|---|---|---|---|---|---|---|---|---|---|---|---|---|---|
| 2 | 0 | 2 | 0 | 2 | 0 | 2 | 0 | 2 | 0 | 2 | 0 | 2 | 0 | 2 | 3 | 2 | 3 | 2 | 3 | 2 | 3 | 2 | 3 |
| 4 | 5 | 4 | 5 | 4 | 5 | 4 | 5 | 4 | 5 | 4 | 5 | 4 | 5 | 5 | 6 | 5 | 6 | 5 | 6 | 5 | 6 | 5 | 6 |
| 7 | 0 | 7 | 0 | 7 | 8 | 7 | 8 | 7 | 8 | 7 | 8 | 7 | 8 | 8 | 9 | 8 | 9 | 8 | 9 | 8 | 9 | 8 | 9 |
| 9 | 10 | 9 | 10 | 10 | 1 | 10 | 11 | 10 | 11 | 10 | 11 | 10 | 11 | 11 | 12 | 11 | 12 | 11 | 12 | 11 | 12 | 12 | 13 |
| 12 | 0 | 12 | 13 | 12 | 13 | 13 | 0 | 13 | 14 | 13 | 14 | 13 | 14 | 14 | 15 | 14 | 15 | 14 | 15 | 14 | 15 | 15 | 16 |
| 14 | 15 | 15 | 0 | 15 | 16 | 15 | 16 | 16 | 0 | 16 | 17 | 16 | 17 | 17 | 18 | 17 | 18 | 17 | 18 | 18 | 19 | 18 | 19 |
| 17 | 0 | 17 | 18 | 18 | 0 | 18 | 19 | 18 | 19 | 19 | 20 | 19 | 20 | 20 | 21 | 20 | 21 | 21 | 22 | 21 | 22 | 21 | 22 |
| 19 | 20 | 20 | 21 | 20 | 21 | 21 | 22 | 21 | 22 | 22 | 23 | 22 | 23 | 23 | 24 | 23 | 24 | 24 | 25 | 24 | 25 | 25 | 26 |
| 22 | 23 | 23 | 0 | 23 | 24 | 24 | 0 | 24 | 25 | 25 | 0 | 25 | 26 | 26 | 27 | 26 | 27 | 27 | 28 | 27 | 28 | 28 | 29 |
| 25 | 0 | 25 | 26 | 26 | 0 | 26 | 27 | 27 | 28 | 27 | 28 | 28 | 29 | 29 | 30 | 29 | 30 | 30 | 31 | 30 | 31 | 31 | 32 |
| 27 | 28 | 28 | 0 | 28 | 29 | 29 | 30 | 30 | 0 | 30 | 31 | 31 | 32 | 32 | 33 | 32 | 33 | 33 | 34 | 34 | 35 | 34 | 35 |
| 30 | 0 | 30 | 31 | 31 | 32 | 32 | 33 | 32 | 33 | 33 | 34 | 34 | 35 | 35 | 36 | 35 | 36 | 36 | 37 | 37 | 38 | 38 | 39 |

APPENDIX B-continued

VERTICAL SCAN SELECT TABLE

| 32 | 33 | 33 | 34 | 34 | 0 | 35 | 0 | 35 | 36 | 36 | 37 | 37 | 38 | 38 | 39 | 38 | 39 | 39 | 40 | 40 | 41 | 41 | 42 |
|---|---|---|---|---|---|---|---|---|---|---|---|---|---|---|---|---|---|---|---|---|---|---|---|
| 35 | 0 | 36 | 0 | 36 | 37 | 37 | 38 | 38 | 39 | 39 | 40 | 40 | 41 | 41 | 42 | 41 | 42 | 42 | 43 | 43 | 44 | 44 | 45 |
| 37 | 38 | 38 | 39 | 39 | 40 | 40 | 41 | 41 | 42 | 42 | 43 | 43 | 44 | 44 | 45 | 44 | 45 | 45 | 46 | 46 | 47 | 47 | 48 |
| 40 | 41 | 41 | 42 | 42 | 43 | 43 | 44 | 44 | 45 | 45 | 46 | 46 | 47 | 47 | 48 | 48 | 49 | 49 | 50 | 50 | 51 | 51 | 52 |

$32 <$ HEIGHT $<= 64$

| HT=53 | | HT=54 | | HT=55 | | HT=56 | | HT=57 | | HT=58 | | HT=59 | | HT=60 | | HT=61 | | HT=62 | | HT=63 | | HT=64 | |
|---|---|---|---|---|---|---|---|---|---|---|---|---|---|---|---|---|---|---|---|---|---|---|---|
| 2 | 3 | 2 | 3 | 2 | 3 | 2 | 3 | 2 | 3 | 2 | 3 | 2 | 3 | 2 | 3 | 2 | 3 | 2 | 3 | 2 | 3 | 3 | 4 |
| 5 | 6 | 5 | 6 | 5 | 6 | 6 | 7 | 6 | 7 | 6 | 7 | 6 | 7 | 6 | 7 | 6 | 7 | 6 | 7 | 6 | 7 | 7 | 8 |
| 8 | 9 | 9 | 10 | 9 | 10 | 9 | 10 | 9 | 10 | 9 | 10 | 10 | 11 | 10 | 11 | 10 | 11 | 10 | 11 | 10 | 11 | 11 | 12 |
| 12 | 13 | 12 | 13 | 12 | 13 | 13 | 14 | 13 | 14 | 13 | 14 | 13 | 14 | 14 | 15 | 14 | 15 | 14 | 15 | 14 | 15 | 15 | 16 |
| 15 | 16 | 15 | 16 | 16 | 17 | 16 | 17 | 16 | 17 | 17 | 18 | 17 | 18 | 17 | 18 | 18 | 19 | 18 | 19 | 18 | 19 | 19 | 20 |
| 18 | 19 | 19 | 20 | 19 | 20 | 20 | 21 | 20 | 21 | 20 | 21 | 21 | 22 | 21 | 22 | 21 | 22 | 22 | 23 | 22 | 23 | 23 | 24 |
| 22 | 23 | 22 | 23 | 23 | 24 | 23 | 24 | 23 | 24 | 24 | 25 | 24 | 25 | 25 | 26 | 25 | 26 | 26 | 27 | 26 | 27 | 27 | 28 |
| 25 | 26 | 26 | 27 | 26 | 27 | 27 | 28 | 27 | 28 | 28 | 29 | 28 | 29 | 29 | 30 | 29 | 30 | 30 | 31 | 30 | 31 | 31 | 32 |
| 28 | 29 | 29 | 30 | 29 | 30 | 30 | 31 | 31 | 32 | 31 | 32 | 32 | 33 | 32 | 33 | 33 | 34 | 33 | 34 | 34 | 35 | 35 | 36 |
| 32 | 33 | 32 | 33 | 33 | 34 | 34 | 35 | 34 | 35 | 35 | 36 | 35 | 36 | 36 | 37 | 37 | 38 | 37 | 38 | 38 | 39 | 39 | 40 |
| 35 | 36 | 36 | 37 | 36 | 37 | 37 | 38 | 38 | 39 | 38 | 39 | 39 | 40 | 40 | 41 | 40 | 41 | 41 | 42 | 42 | 43 | 43 | 44 |
| 38 | 39 | 39 | 40 | 40 | 41 | 41 | 42 | 41 | 42 | 42 | 43 | 43 | 44 | 44 | 45 | 44 | 45 | 45 | 46 | 46 | 47 | 47 | 48 |
| 42 | 43 | 42 | 43 | 43 | 44 | 44 | 45 | 45 | 46 | 46 | 47 | 46 | 47 | 47 | 48 | 48 | 49 | 49 | 50 | 50 | 51 | 51 | 52 |
| 45 | 46 | 46 | 47 | 47 | 48 | 48 | 49 | 48 | 49 | 49 | 50 | 50 | 51 | 51 | 52 | 52 | 53 | 53 | 54 | 54 | 55 | 55 | 56 |
| 48 | 49 | 49 | 50 | 50 | 51 | 51 | 52 | 52 | 53 | 53 | 54 | 54 | 55 | 55 | 56 | 56 | 57 | 57 | 58 | 58 | 59 | 59 | 60 |
| 52 | 53 | 53 | 54 | 54 | 55 | 55 | 56 | 56 | 57 | 57 | 58 | 58 | 59 | 59 | 60 | 60 | 61 | 61 | 62 | 62 | 63 | 63 | 64 |

We claim:

1. A method of obtaining a normalized representation of fixed dimensions of a variable size, hand printed character comprising the steps of:
    scanning said character,
    storing a bit representation of said scanned character in a video line buffer, said bit representation comprising a matrix of rows and columns of bits,
    determining the height and width of said matrix representation,
    selecting rows of said matrix representation for subsequent processing in accordance with said height, said rows being selected individually or logically OR combined with an adjacent row,
    separating each selected row into a plurality of separate groups and logically combining the bits in each separate group so as to provide a row of bits of a fixed length for each said selected row, said groups being combined in accordance with said width,
    storing each said row of fixed length in a character video buffer,
    OR combining each bit in each row of fixed length with all the bits in the corresponding position of each of the other rows, said combining indicating the actual width of said fixed length rows containing character information, and
    selectively deleting columns of bits in said fixed length rows in accordance with said combining indicating the actual width so as to further reduce said fixed length rows to an optimal minimum width capable of being recognized by a character recognition system.

2. A method of generating a representation of fixed-dimension from a character of variable dimension comprising the steps of:
    scanning the character,
    storing a binary representation of said scanned character in a buffer, said binary representation including a matrix of rows and columns of binary information;
    determining the height and width of said matrix;
    selecting rows of the matrix for subsequent processing in accordance with the height of the matrix determined, said rows being either selected without change or by a logical OR combination between respective bits in adjacent rows;
    separating each selected row into a plurality of subsets of bits and logically combining each subset in accordance with the width of the matrix, whereby a row of bits of fixed length is generated for each selected row;
    storing each such fixed length row of bits into a character video buffer;
    combining each respective bits in selected rows with bits in corresponding locations in selected rows as defined by a stored vector, said combining indicating the actual width of fixed length containing character information; and
    selectively deleting columns of bits in said fixed length rows in accordance with the width of said rows to a predetermined size upon which a character recognition system may operate.

* * * * *